United States Patent Office 2,746,737
Patented May 22, 1956

2,746,737

PROCESS FOR HEATING UP APPARATUS FOR CARRYING OUT EXOTHERMIC GAS REACTIONS

Walter Pohl, Frankfurt am Main, Germany, assignor to Deutsche Gold- und Silber-Scheideanstalt vormals Roessler, Frankfurt am Main, Germany No Drawing. Application July 7, 1953,
Serial No. 366,617

Claims priority, application Germany July 9, 1952

7 Claims. (Cl. 263—52)

The present invention relates to an improved procedure for heating up apparatus employed for carrying out exothermic gas reactions to reaction temperatures.

Exothermic gas reactions have attained great importance in the chemical arts. As examples, the following may be mentioned: the oxidation of ammonia in the formation of nitric acid, the production of formaldehyde by the catalytic oxidation of methanol or methane, and the production of hydrocyanic acid from methane and ammonia by the Andrussow process. Reactions of this type are exothermic and, consequently, the apparatus required thereof need not be supplied with heat after they have been set into operation. It is necessary, however, that the composition of the gases converted is outside of the explosive limits in order to avoid flashbacks from the catalyst employed so that it is customary to operate with one of the gas components to be converted in considerable excess over the stoichiometric proportions required for the reaction or to dilute the reaction gases sufficiently with another gas such as nitrogen.

It is necessary, however, to raise the temperature of the apparatus to that sufficient to initiate the desired reaction, before the reaction can proceed. Generally such preliminary heating up of the apparatus is achieved by external heating or by passing heated gases therethrough which are produced in a separate apparatus. When the reaction apparatus has reached the required temperature, the gas mixture to be converted is introduced and the heating discontinued. It is clear that not every heated gas can be employed for this purpose in view of the possibility of explosions or other disturbances, such as, for example, inactivation of the catalyst. It has, for example, been customary to preheat the large catalytic reactors employed for the catalytic oxidation of methanol to produce formaldehyde with air which has been preheated to the necessary temperature in an electric heater.

It has now been unexpectedly discovered according to the invention that the necessary preheating of the apparatus for carrying out exothermic gas reactions can be achieved in a very short time and with lowest energy and apparatus requirements using only components of the gaseous mixture participating in the reaction for such preheating purposes.

This can be achieved according to the invention in several ways, for example, by providing in addition to the normal conduit for supplying the stream of gases to be reacted to the reaction apparatus, a further conduit for a secondary gas stream provided with one or more inlets opening up into the reaction apparatus in front of the actual reaction zone. In preheating such apparatus the gas mixture to be reacted is permitted to flow into the apparatus at not too great a velocity, and introducing with simultaneous ignition a regulated quantity of the gas component which is not present in excess in such gas mixture into the apparatus through the other conduit, the gas velocities of the gases being regulated so that a reaction with flame formation occurs. The ignition of the secondary gas stream at the point of its entry into the apparatus is expediently achieved electrically with the aid of a spark or a glowing wire. As soon as the desired reaction temperature is achieved in the apparatus the secondary heating gas stream is cut off.

In smaller catalytic apparatus the secondary heating gas is preferably introduced tangentially and transverse to the direction of the flow of the reaction gas mixture so that the ignition of the gas mixture is initiated at the outer wall and advances inwardly from the outer wall so that the greatest heating effect is obtained at the outer wall which is most subject to heat loss by radiation.

In larger catalytic apparatus it is advantageous to divide the heating gas into several streams and to introduce a portion of such streams tangentially and a portion thereof radially in a direction transverse to the flow of the reaction gas mixture. This ensures that the entire cross section of the apparatus is traversed with the flaming gas and that the reaction zone is heated uniformly.

In another modification of the process according to the invention the component of the reaction gas mixture employed in excess is first only supplied to the reaction apparatus through the main conduit normally serving to supply the reaction gas mixture to the apparatus whereas the second component only is supplied to the apparatus through the inlet or inlets for the heating gases and ignited as it enters the apparatus. As the heating of the apparatus progresses, the second gas component is gradually added to the main conduit and the quantity separately introduced as heating gas is correspondingly gradually reduced so that when the desired reaction temperature is reached in the apparatus the main gas stream contains the reaction gas mixture in the desired proportions and it is merely necessary to turn off the ignition apparatus employed as well as the secondary gas stream employed as heating gas, and the reaction will then proceed at the catalyst.

In accordance with still a further modification of the process according to the invention, the component of the reaction gas mixture which is in excess is continuously supplied to the reaction apparatus through a main conduit, and the component which is used in smaller quantities in the reaction gas mixture is continuously introduced into the reaction apparatus through the inlet or inlets with simultaneous ignition as the heating gas. In this case it is only necessary after completion of the preheating period to turn off the ignition devices and momentarily to interrupt the flow of such heating gas stream to extinguish the flames. After the flow of such gas is reestablished, the further reaction takes place upon the preheated catalyst. In this modification the mixture of the reaction gas components is only effected after the components have been introduced into the reaction apparatus.

The process according to the invention provides a number of technical and economical advantages. It is possible to reduce the preheating time required even for reaction apparatus of large dimensions to a minimum as may be seen from the following example. Furthermore, the heating efficiency is considerably better than when external heating is employed. In addition, with the process according to the invention, it is simpler to adjust the temperature of the preheated reaction space to a definite reaction temperature as with the aid of sufficient observation of the catalyst or suitable measuring instruments the heating can be interrupted by extinguishing the heating flame without danger of overheating by afterheating. The process according to the invention also has the advantage over the processes of the prior art employing preheated gases for heating the reaction space in that in the present process no foreign gases are employed so that danger of poisoning of the catalyst is substantially avoided and that the apparatus requirements are simplified.

The following example will serve to illustrate the manner in which the process according to the invention can be carried out.

*Example*

The following procedure was employed to put into operation a large catalytic furnace 1 meter in diameter for the production of formaldehyde by the catalytic oxidation of methanol with air. In the apparatus employed the reaction zone containing the catalyst was preceded by a space free of catalyst.

The gas mixture required for the reaction, that is, methanol vapor and air in the proportions required for the reaction was prepared by passing air through methanol at a temperature of about 45 to 47° C. at a rate of 500 cubic meters per hour and passed through the furnace. The quantity of methanol was present in such gas mixture in excess whereas the air was deficient so that the gas mixture was outside of the explosive limits. To effect the necessary preheating of the catalyst to proper reaction temperature air was introduced at several points in the catalytic furnace in the space ahead of the catalyst at a rate of 5 to 10 cubic meters per hour with simultaneous electrical ignition. Some of the air inlets were so arranged that the air entered radially, whereas others were so arranged that the air entered tangentially in a direction transverse to the flow of the methanol and air mixture being passed through the furnace. By observing through peepholes, the quantity of air introduced in each of the inlets was adjusted so that the flames formed in the gas space ahead of the catalyst heated the entire cross section of the catalyst as uniformly as possible, without, however, directly contacting the catalyst itself so as to avoid local overheating thereof. The catalyst was preheated to the reaction temperature required for the catalytic oxidation of the methanol in the gas mixture supplied in about 5 to 10 minutes when it was observed that the catalyst began to glow. At this point the introduction and ignition of the additional air employed to effect the preheating was discontinued and the reaction proceeded by itself at the catalyst.

In the example given above, the process was described with reference to formaldehyde production employing a gas mixture deficient in air. In accordance with one of the more recent processes for the production of formaldehyde, a gas mixture is employed upon the other side of the explosive limits, that is, with an excess of air. In such a case supplemental methanol vapor can be introduced as the heating gas instead of air with substantially the same results.

It is also possible in a similar manner to preheat large catalytic furnaces used for other processes beside the catalytic production of formaldehyde from methanol and air described above, such as, for example, in the oxidation of ammonia and the production of hydrocyanic acid by the Andrussow process.

I claim:

1. A method of directly preheating apparatus employed for carrying out continuous catalytic exothermic gas reactions with reactant gas mixtures containing one of the reactant gaseous components in excess, without requiring the use of gases other than the components of the reactant gas mixture, said apparatus having a reaction zone containing a catalyst preceded by a space free from catalyst which comprises passing a gas stream containing at least the reactant gas component which is in excess in the reactant gas mixture to be employed for the catalytic gas reaction through the apparatus and introducing into such stream of gas as it passes through the catalyst free space preceding the reaction zone a separate stream of a reactant gas component which is to be employed in smaller quantities with simultaneous ignition thereof and adjusting the velocity of the gas streams so that the ensuing reaction proceeds with flame formation.

2. A method of directly preheating apparatus employed for carrying out continuous catalytic exothermic gas reactions with reactant gas mixtures containing one of the reactant gaseous components in excess, without requiring the use of gases other than the components of the reactant gas mixture, said apparatus having a reaction zone containing a catalyst preceded by a space free from catalyst which comprises first passing a gas stream containing only the reactant gas component which is in excess in the reactant gas mixture to be employed for the catalytic gas reaction through the apparatus and introducing into such stream of gas as it passes through the catalyst free space preceding the reaction zone a separate stream of the reactant gas component which is to be employed in smaller quantities with simultaneous ignition thereof, adjusting the velocity of the gas streams so that the ensuing reaction proceeds with flame formation, thereafter gradually introducing increasing quantities of the reactant gas component of said second gas stream into the first gas stream at a point ahead of the point at which such second gas stream is introduced and simultaneously gradually decreasing the second stream by a corresponding amount as the heating of the apparatus proceeds so that when the desired reaction temperature is reached the first gas stream is of the desired composition for the catalytic gas reaction, and upon reaching such temperature stopping said second gas stream.

3. A method of directly preheating apparatus employed for carrying out continuous catalytic exothermic gas reactions with reactant gas mixtures containing one of the reactant gaseous components in excess, without requiring the use of gases other than the components of the reactant gas mixture, said apparatus having a reaction zone containing a catalyst preceded by a space free from catalyst which comprises passing a gas stream containing only the reactant gas component which is in excess in the reactant gas mixture to be employed for the catalytic gas reaction through the apparatus and introducing into such stream of gas as it passes through the catalyst free space preceding the reaction zone a separate stream of the reactant gas component which is to be employed in smaller quantities with simultaneous ignition thereof, adjusting the velocity of the gas streams so that the ensuing reaction proceeds with flame formation, the desired reaction temperature is reached in said apparatus stopping ignition of the second gas stream and momentarily interrupting such second gas stream to extinguish the flames, the quantity of the reactant gas components in said gas streams being such that upon reestablishment of the second gas stream the catalytic gas reaction proceeds at the catalyst.

4. A process according to claim 1 in which said second gas stream is introduced tangentially into said first gas stream in a direction transverse to such first gas stream.

5. A process according to claim 1, in which said second gas stream is divided into a number of separate streams a portion of which are introduced tangentially into said first gas stream in a direction transverse to the said first gas stream and a portion of which are introduced radially in a direction transverse to said first gas stream so that the entire cross section of the apparatus is swept with flaming gases.

6. A process according to claim 1 in which the ignition of said second gas stream is effected electrically.

7. A method of directly preheating apparatus employed for the continuous catalytic production of formaldehyde from methanol and air containing mixtures in which the content of one of such reactant gases is in excess of the stoichiometric proportion required for the reaction and sufficient to be above the critical explosive limit without requiring the use of gases other than the components of the reactant gas mixture, which comprises passing a gas stream containing at least the reactant gas component which is in excess in the reactant gas mixture to be employed for the catalytic gas reaction through the apparatus and introducing into such stream of gas as it passes through the catalyst free space preceding the reaction zone a separate stream of a reactant gas component which is to be employed in smaller quantities with simultaneous ignition thereof and adjusting the velocity of the gas streams so that the ensuing reaction proceeds with flame formation.

References Cited in the file of this patent

UNITED STATES PATENTS 2,569,846     Cornell  ---------------- Oct. 2, 1951